(12) United States Patent
Mathi et al.

(10) Patent No.: US 10,759,598 B2
(45) Date of Patent: Sep. 1, 2020

(54) RACK STORE WITH A ROUNDABOUT ON A CLOSED GUIDE TRACK

(71) Applicant: KNAPP AG, Hart bei Graz (AT)

(72) Inventors: Franz Mathi, Gleisdorf (AT); Heiko Süss, Graz (AT); Christoph Lafer, Fehring (AT); Wolfgang Puntigam, Studenzen (AT)

(73) Assignee: KNAPP AG, Hart bei Graz (AT)

( * ) Notice: Subject to any disclaimer, the term of this patent is extended or adjusted under 35 U.S.C. 154(b) by 291 days.

(21) Appl. No.: 15/554,257

(22) PCT Filed: Jan. 12, 2016

(86) PCT No.: PCT/EP2016/050421
§ 371 (c)(1),
(2) Date: Aug. 29, 2017

(87) PCT Pub. No.: WO2016/139003
PCT Pub. Date: Sep. 9, 2016

(65) Prior Publication Data
US 2018/0050870 A1 Feb. 22, 2018

(30) Foreign Application Priority Data
Mar. 4, 2015 (AT) .............................. A 50168/2015

(51) Int. Cl.
*B65G 1/04* (2006.01)
(52) U.S. Cl.
CPC .................................. *B65G 1/0492* (2013.01)
(58) Field of Classification Search
CPC .......................... B65G 1/0414; B65G 1/0492
USPC ....................................................... 414/279
See application file for complete search history.

(56) References Cited

U.S. PATENT DOCUMENTS

2011/0262253 A1* 10/2011 Krizmanic ........... B65G 1/0414
414/279

FOREIGN PATENT DOCUMENTS

| DE | 10 2011 014 394 A1 | 9/2012 |
| EP | 2 527 274 A1 | 11/2012 |
| WO | 2014/204300 A1 | 12/2014 |

OTHER PUBLICATIONS

Int'l Preliminary Report on Patentability for corresponding Int'l Pat. Appln. No. PCT/EP2016/050421 dated Sep. 5, 2017, 5 pgs.
Int'l Search Report and Written Opinion of the Int'l Searching Authority for corresponding Int'l Pat. Appln. No. PCT/EP2016/050421 dated Apr. 14, 2016, 10 pages.

* cited by examiner

*Primary Examiner* — Saul Rodriguez
*Assistant Examiner* — Willie Berry, Jr.
(74) *Attorney, Agent, or Firm* — Merchant & Gould P.C.

(57) ABSTRACT

A self-contained guide track is formed by first guide tracks and second guide tracks of a rack level and each track section of the closed guide track is determined from an intersection point of one of the first guide tracks with one of the second guide tracks to the next intersection point of one of the first guide tracks with one of the second guide tracks and the at least one rail vehicle is configured to be controlled on the track sections of the closed guide track during storing and removing the items in a main direction in the form of a roundabout such that the track section of the closed guide track, on which more than one rail vehicle is located, is used by the rail vehicles only in the main direction.

11 Claims, 5 Drawing Sheets

RACK STORE WITH A ROUNDABOUT ON A CLOSED GUIDE TRACK

CROSS-REFERENCE TO RELATED APPLICATION

This application is a National Stage Application of PCT/EP2016/050421, filed 12 Jan. 2016, which claims benefit of Serial No. A 50168/2015, filed 4 Mar. 2015 in Austria and which applications are incorporated herein by reference. To the extent appropriate, a claim of priority is made to each of the above-disclosed applications.

BACKGROUND OF THE INVENTION

The invention relates to a rack store for storing items in storage locations of racks, wherein at least one rack lane is formed between at least two racks, and wherein first guide tracks are provided substantially in the direction of the racks and second guide tracks are provided substantially transverse to the racks, on which guide tracks at least one rail vehicle can be moved in a controlled manner by control means for storing and removing items.

Patent application WO2014/204 300 A1 discloses such a rack store with control means for controlling the path, which a rail vehicle should take for storing and removing an item. Depending on how dense the traffic of rail vehicles is on individual guide tracks and intersection points of guide tracks, or, respectively, how dense it is planned to be by the control means, the control means identify them as "blocked" or, for example, as "fit for traffic in a directional way only at a certain speed". This is supposed to serve for ensuring an operation of the rail vehicles on the guide tracks for storing and removing items which is as smooth as possible. However, it has turned out to be a disadvantage of said known rack store that the control means are very complex and thus prone to failure and fail to achieve the throughput required for high performing stores.

If items are removed from a rack store, such as the rack store disclosed in WO2014/204 300 A1, toward a picking station, they should be removed from the rack store and placed onto the materials handling equipment in an already sorted manner, if possible, so that as little as possible has to be sorted on the materials handling equipment. For this purpose, the control means actuate the rail vehicles such that the rail vehicles will fetch the items consecutively from the individual storage locations, according to the desired sorting, and will deliver them to the materials handling equipment via a lift, whereupon the materials handling equipment will convey the sorted items to the respective picking station. However, because of "blocked" guide tracks, defective rail vehicles or other circumstances, it may happen that the items cannot be removed from the rack store with the requested sorting. For this reason, a so-called pre-zone must be implemented in front of the rack store as part of the materials handling equipment, in which pre-zone it is possible to sort the items, for example, by a materials handling equipment guided in a circle, before the sorted items are discharged from the materials handling equipment guided in a circle and are conveyed to the respective picking station. However, in doing so, the lifts of the rack store and the sorting in the pre-zone form a bottleneck limiting the throughput during the removal from storage, since all the items removed from the various rack levels of the rack store have to be sorted in the materials handling equipment guided in only one circle.

SUMMARY OF THE INVENTION

The invention is based on the object of providing a rack store and a method for operating such a rack store, wherein the above-mentioned disadvantages are avoided and as many items as possible can be stored, placed in and removed from storage and picked in the smallest of spaces. According to the invention, said object is achieved in that a self-contained guide track is formed by first guide tracks and second guide tracks of a rack level and that each track section of the closed guide track is determined from an intersection point of one of the first guide tracks with one of the second guide tracks to the next intersection point of one of the first guide tracks with one of the second guide tracks and that the control means for controlling the rail vehicles on the track sections of the closed guide track during storing and removing the items is designed in a main direction in the form of a roundabout such that the track section of the closed guide track, on which more than one rail vehicle is located, is used by the rail vehicles only in the main direction and such that the track section of the closed guide track, on which no other rail vehicle is located, is trafficable or, respectively, if necessary, used by a rail vehicle against the main direction.

By determining a main direction for travelling on the guide tracks, the advantage is obtained that the controlling of the rail vehicles by the control means can take place far more efficiently. The combination of two first and two second guide tracks of a rack level to form a closed guide track which, as a roundabout, is used by the rail vehicles in the main direction brings about the advantage that the rail vehicles can be controlled at a relatively high speed and with a small number of braking operations, whereby wear and the consumption of energy are reduced. In order to increase the efficiency and the throughput for storing and removing items from the rack store even further, certain track sections on which no other rail vehicle is currently travelling can also be used against the main direction. In this connection, the smallest possible track section is understood to be the track section of a guide track between adjacent intersection points with other guide tracks.

In this connection, the closed guide track forming the roundabout can be implemented to be completely or partially within the rack store or else located upstream of the racks on each rack level. This results in the advantage that, on each rack level, there is the possibility of sorting the items removed on the respective rack level. Only afterwards, the items sorted according to the rack level are transferred to the lift and conveyed downwards with it. In this way, the advantage is obtained that the items removed from the rack store are delivered by the lift in a completely sorted manner. This allows to provide picking stations directly at the lifts of the rack store, for which reason it is possible to do without a classical pre-zone and the corresponding materials handling equipment for conveying the items to the picking stations. This substantially reduces the space required by the picking system and the time for picking an order. By omitting the upstream materials handling equipment, costs can additionally be saved and downtimes of the picking system for repair work on the materials handling equipment can be reduced. The same advantage as with the picking stations is also achieved by connecting item handling stations, goods receipt stations or robot handling stations directly to the rack store.

It is also advantageous to define the main direction in the closed guide track on superimposed rack levels as opposite in each case. In this way, it is possible to use the optimum level in terms of distance in the course of restocking for items to be returned to storage, for which a new demand already exists at another picking station.

Also, rail vehicles can be conveyed as needed via a rail vehicle lift to a rack level on which many rail vehicles are currently required for storing and removing items.

Those and further advantageous embodiments of the rack store according to the invention are illustrated in further detail below, on the basis of the figures.

DETAILED DESCRIPTION OF THE PREFERRED EMBODIMENTS

Figure 1:
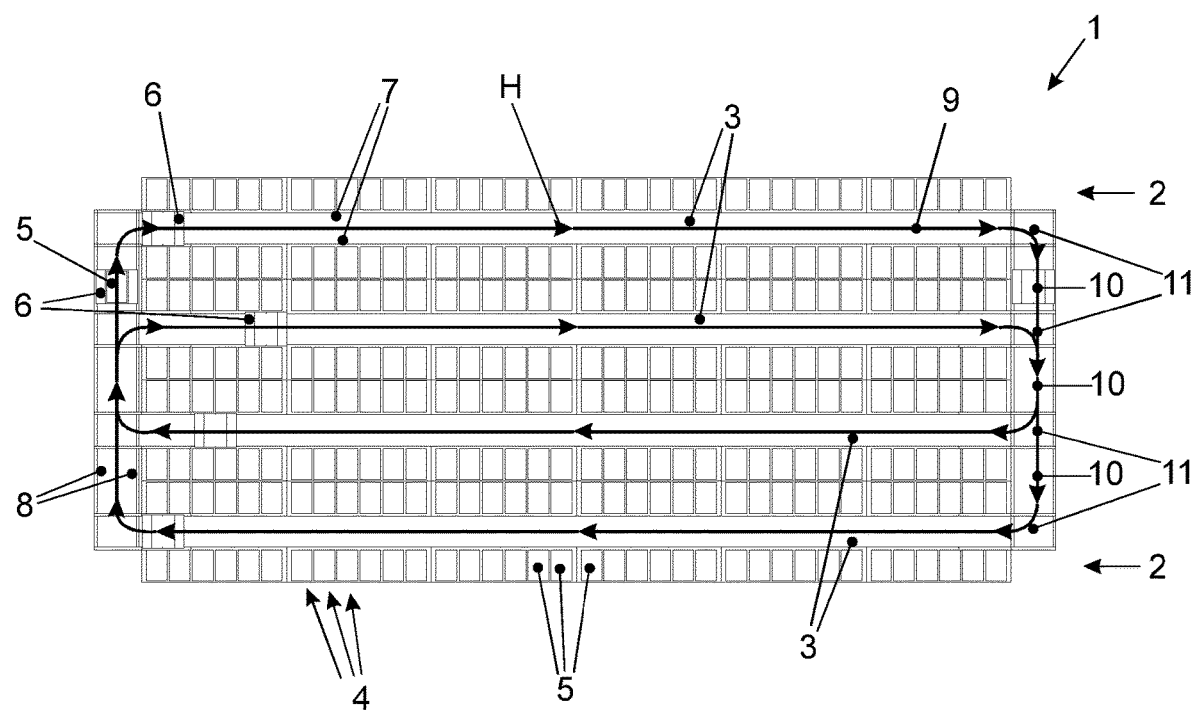
FIG. 1 shows a top view of a rack level of a rack store, wherein the second guide tracks of the closed guide track are provided on the front side of the racks.

FIG. 1 shows a top view of a rack level of a rack store 1 comprising eight racks 2, out of which six racks 2 are compiled as a double rack, whereby four rack lanes 3 are formed. In the racks 2, a plurality of storage locations 4 for storing items 5 are provided. For storing the items 5 in the rack store 1 and for removing the items 5 from the rack store 1, the rack store 1 has rail vehicles 6 guided on guide tracks, which rail vehicles are controlled by control means, which are not illustrated any further in the figures. Such rail vehicles 6 guided on guide tracks are known to a person skilled in the art, for example, from patent application WO2014/204 300 A1, for which reason the technical implementation thereof is not addressed any further herein.

In the rack lanes 3 of the rack store 1, rails forming first guide tracks 7 are provided for the rail vehicles 6. On the two front sides of the racks 2 and thus extending transversely to the racks 2, rails forming second guide tracks 8 are provided for the rail vehicles 6. Via the first guide tracks 7 and the second guide tracks 8, a rail vehicle 6 can reach every storage location 4 of the rack level of the rack store 1 in order to pull an item 5 from a storage location 4 onto the rail vehicle 6 or to push it from the rail vehicle 6 into the storage location 4.

In the rack store 1, the control means form a self-contained guide track 9 from two first guide tracks 7 and two second guide tracks 8 of the rack level, for which self-contained guide track a main direction H is defined as the transport direction for the rail vehicles 6 for storing and removing items 5, as indicated by arrows in the figure. In the exemplary embodiment according to FIG. 1, intermeshing closed guide tracks 9 are determined which define a transport direction for the rail vehicles 6 for each rack lane 3. Consequently, the control means guide rail vehicles 6 through the rack store 1 primarily according to those main directions, whereby a structured traffic of the rail vehicles 6 and a large throughput during the storing and removal of items 5 are achieved. On the one hand, several rail vehicles 6 can travel simultaneously on one guide track, on the other hand, the uniform transport direction brings about the advantage that it is possible to travel at a higher speed and with a smaller number of braking operations.

Furthermore, track sections 10 of the closed guide track 9 are defined by the control means of the rack store 1, which track sections always extend from an intersection point 11 of one of the first guide tracks 7 with one of the second guide tracks 8 to the next intersection point 11 of one of the first guide tracks 7 with one of the second guide tracks 8. The control means are now configured for having rail vehicles 6 travel on track sections 10 on which currently no other rail vehicle 6 is located, or, respectively, will be located for the duration of travelling of said one rail vehicle 6, also against the main direction H. In this way, the advantage is obtained that, during the route planning by the control means, long distances to travel for a rail vehicle 6 according to the main direction H can be converted into a short distance against the main direction H, if currently there is no traffic. As a result, the throughput of the items 6 transported with the rail vehicles 6 can be increased further.

Figure 2:
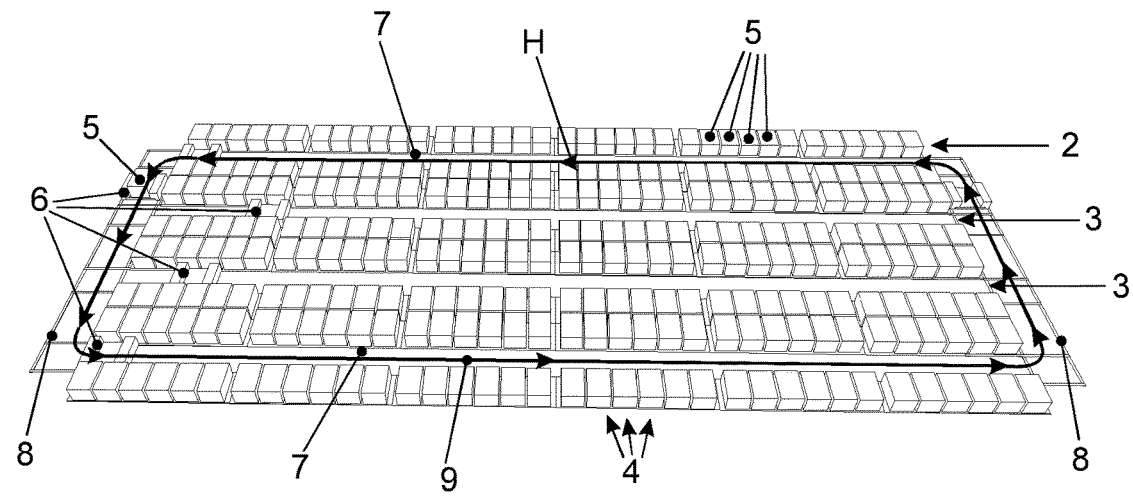
FIG. 2 shows an oblique view of the rack level of the rack store according to FIG. 1, wherein only one closed guide track is provided.

FIG. 2 shows an oblique view of the rack level of the rack store 1 according to FIG. 1. However, in FIG. 2, a different definition of the main direction H has been performed by the control means by way of example. According to this exemplary embodiment of the invention, the main direction H has been defined only for the outer rack rows 3 and herein in an anti-clockwise direction. The determination where storing in and removing from the rack store 1 takes place and where fast-moving and slow-moving items 5 are stored may affect the definition of the main direction H.

Figure 3:
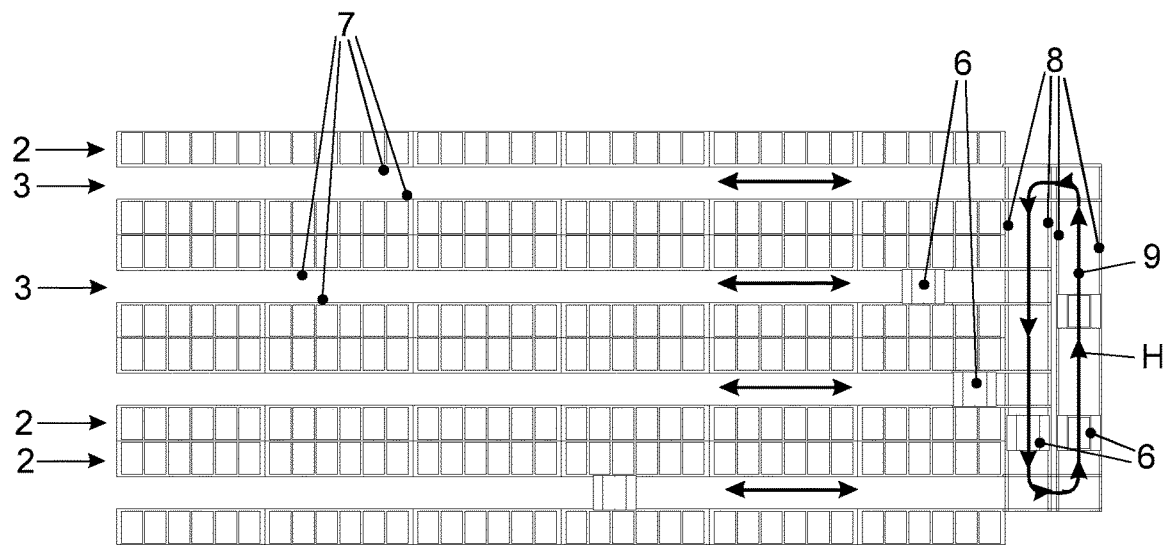
FIG. 3 shows a top view of a rack level of a rack store, wherein the second guide tracks of the closed guide track are provided on only one front side of the racks.

FIG. 3 shows a top view of a rack level of a rack store 1, wherein the second guide tracks 8 of the closed guide track 9 are arranged on only one front side of the racks 2. As a result, the advantage is obtained that a closed guide track 9 is arranged upstream of the first guide tracks 7 of each rack level, from which guide track rail vehicles 6 can be guided into each one of the first guide tracks 7. Thus, items 5 removed from the storage locations 4 of said rack level can be delivered to a lift in 100% sorted manner.

Figure 4:
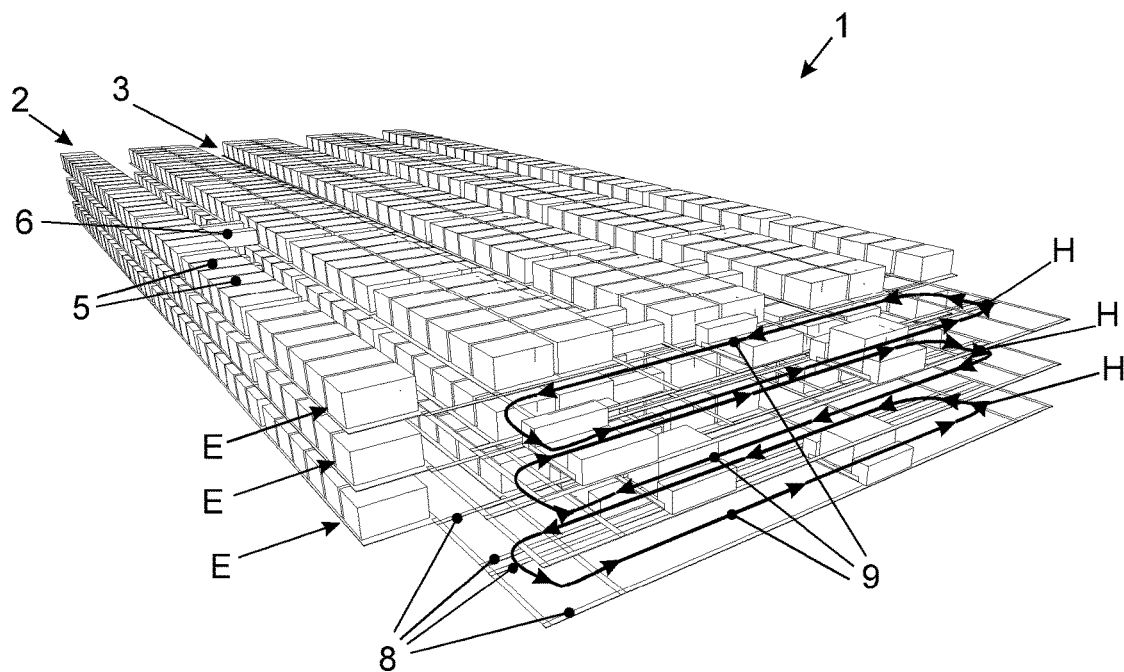
FIG. 4 shows an oblique view of three rack levels of the rack store according to FIG. 3.

FIG. 4 shows an oblique view of three rack levels E of the rack store 1 according to FIG. 3. The control means actuate the rail vehicles 6 in closed guide tracks 9 arranged on superimposed rack levels E, always in opposite main directions H. In this way, it is possible to use the optimum level in terms of distance in the course of restocking for items to be returned to storage, for which a new demand already exists at another picking station, for a renewed removal from storage.

Figure 5:
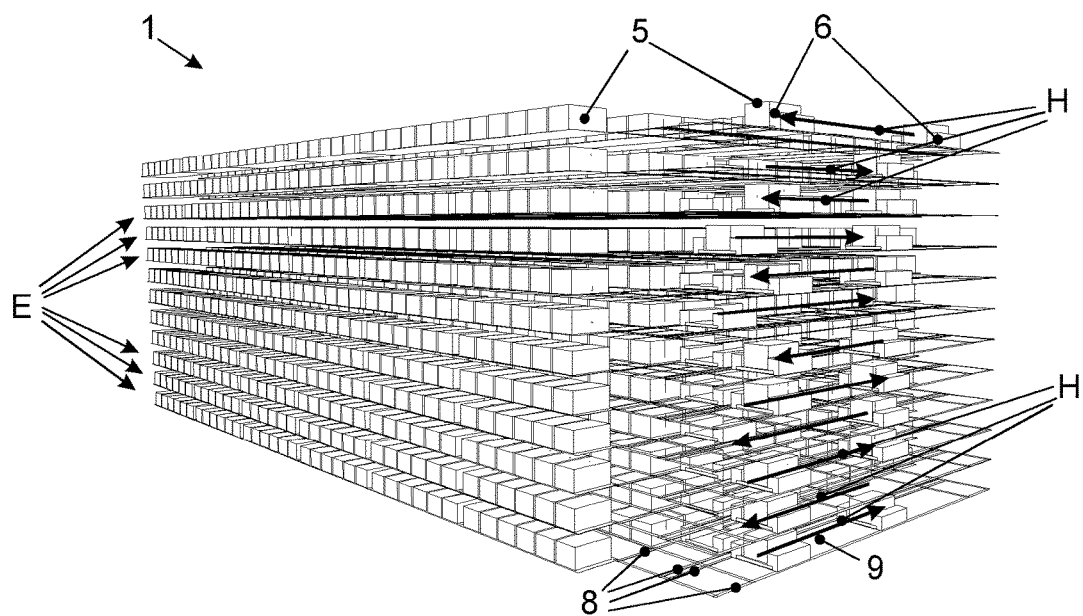
FIG. 5 shows an oblique view of 12 rack levels of the rack store according to FIG. 3.

FIG. 5 shows an oblique view of 12 rack levels E of the rack store 1 according to FIG. 3. The closed guide tracks 9 are again arranged on the front side of the rack store 1 as an extension of the rack lanes 3, wherein the main directions H, which, in each case, are opposite on superimposed rack levels E, are indicated with only one arrow.

Figure 6:
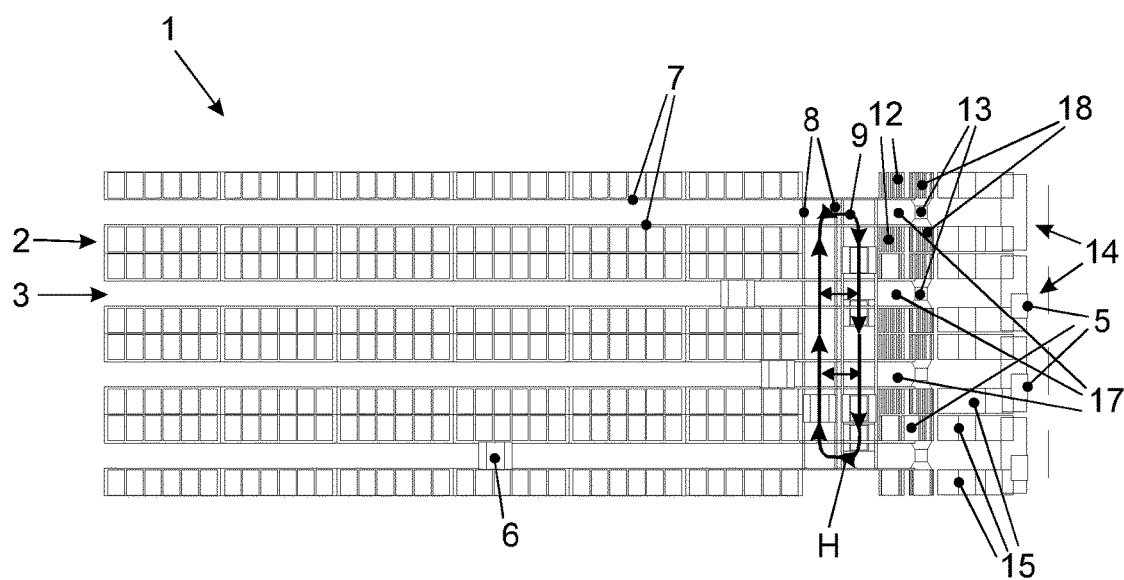
FIG. 6 shows a top view of a rack level of a rack store, wherein the second guide tracks of the closed guide track are provided on only one front side of the racks and are connected via connecting guide tracks to lifts where picking stations are arranged.

FIG. 6 shows a top view of a rack level E of a rack store 1, wherein the second guide tracks 8 of the closed guide track 9 are again provided on only one front side of the racks 3. In the rack store 1, loading bays 17 are attached to the closed guide track 9, in which loading bays rail vehicles can deliver items 5 onto connecting tracks 12, or can pick them up from there, without blocking the flow of rail vehicles on the closed guide track. Connecting tracks 12 are formed by a short materials handling equipment and decouple the process of loading and unloading from the lift movement in that items 5 unloaded from the rail vehicles 6 are transferred there to lift platforms 18 of the lifts 13. Picking stations 14 comprising a short materials handling equipment as a connecting track 15 to the actual manual picking station are connected directly to the lifts 13 of the rack store 1. As a result, the advantage is obtained that four picking stations 14 are arranged directly at the rack store 1 and the pre-zone, which otherwise is common, can be omitted. In this way, space is saved in the storage depot, which is why more items can be stored on the same surface area of the storage depot.

According to another exemplary embodiment, the connecting tracks 12 can be attached to the closed guide track 9 also without interposed loading bays 17. Instead of the manual picking stations, automatic picking stations operated by robots or, respectively, robot handling stations could also be implemented. In the most general sense, item handling stations could be implemented directly at the lifts 13, where certain actions are performed on the items 5 which are to be stored or have been removed from storage. Similarly, goods receipt stations for items 5 to be stored could be implemented directly at the lifts 13.

Figure 7:
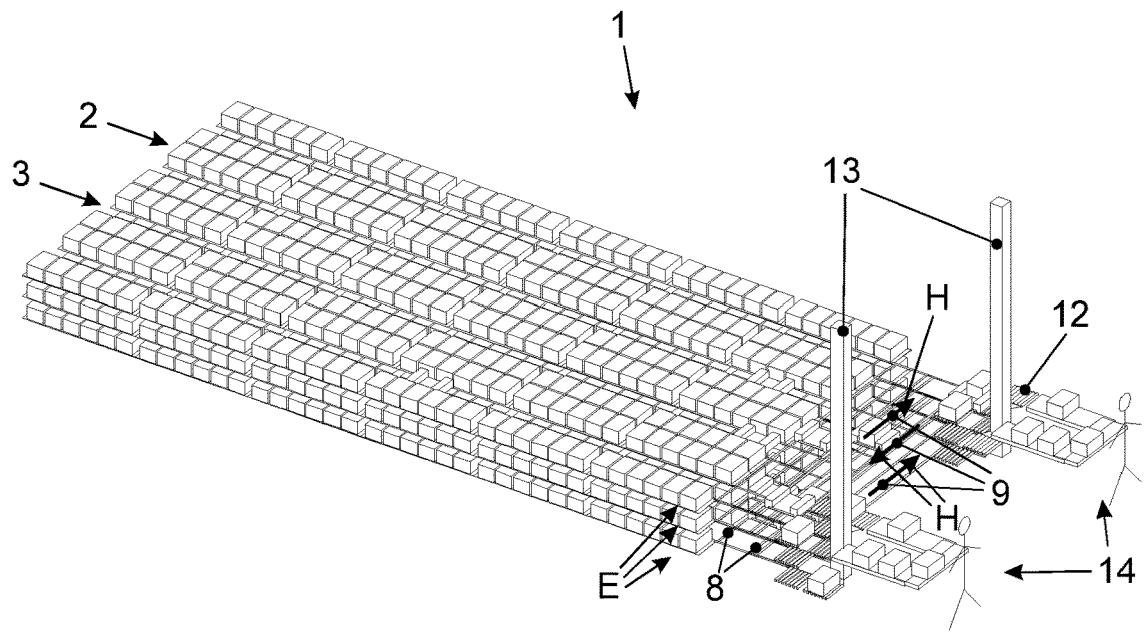
FIG. 7 shows an oblique view of three rack levels of the rack store according to FIG. 6.
Figure 8:
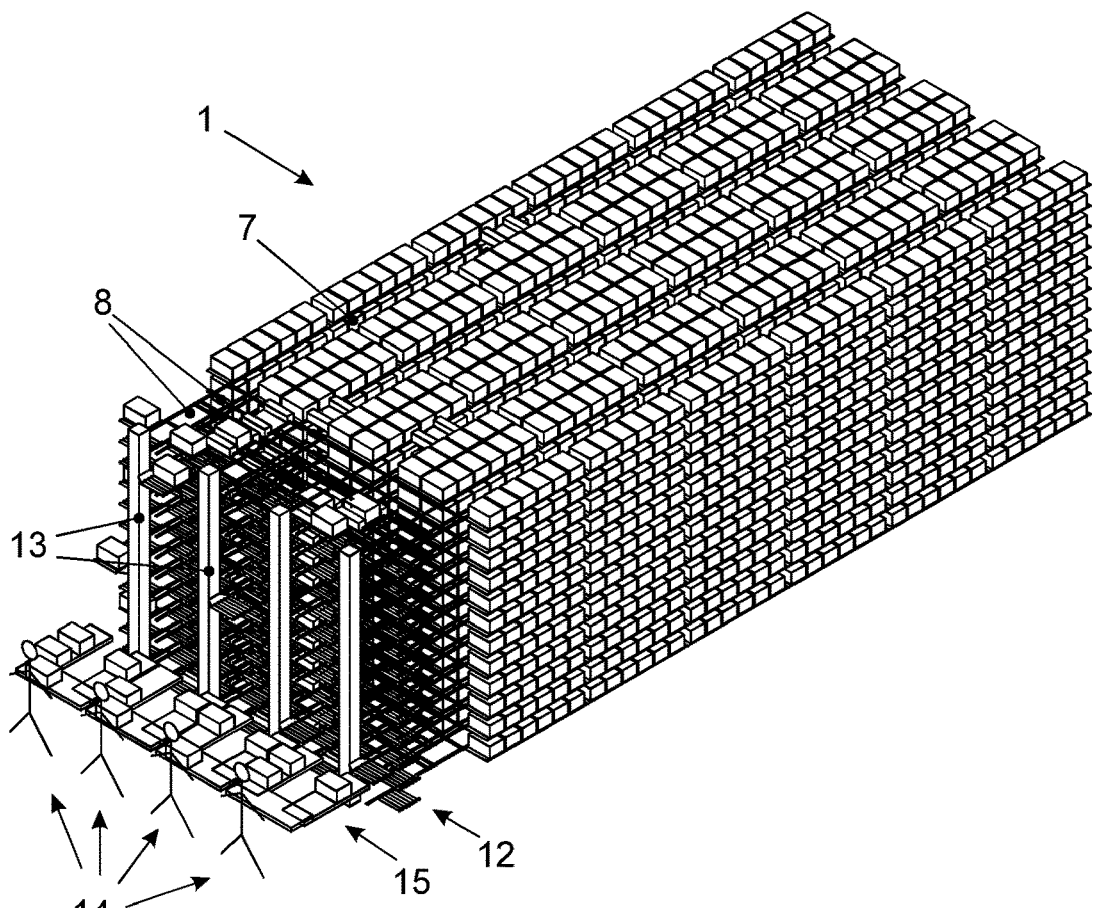
FIG. 8 shows an oblique view of 12 rack levels of the rack store according to FIG. 6.

FIG. 7 shows an oblique view of three rack levels E, and FIG. 8 shows an oblique view of 12 rack levels E of the rack store 1 according to FIG. 6. For the sake of better presentability, only two of the four lifts 13 and picking stations 14 are depicted in FIG. 7. It is clearly visible in what a small area of the storage depot the rack store 1 can be implemented with the possibility of sorting the items 5 on each rack level E and four picking stations 14.

FIG. 8 shows an oblique view of 12 rack levels of the rack store according to FIGS. 6 and 7.

Figure 9:
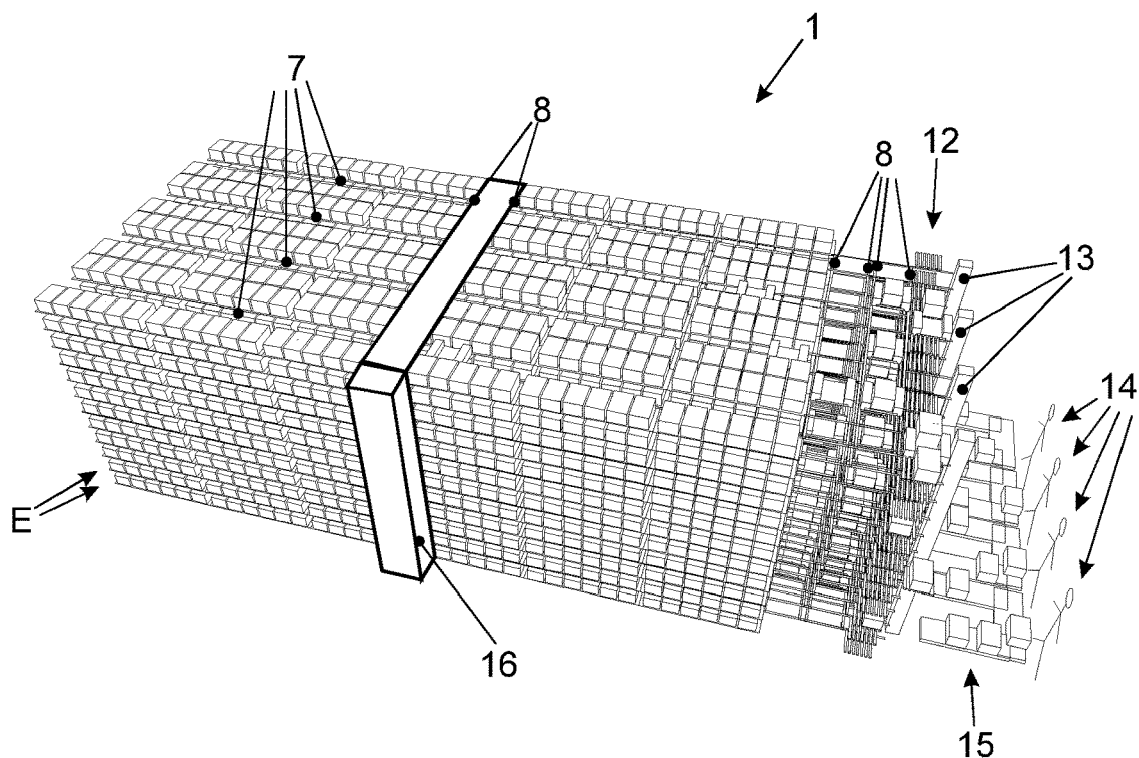
FIG. 9 shows a further oblique view of 12 rack levels of the rack store according to FIG. 6, wherein a rail vehicle lift is provided.

FIG. 9 shows a further oblique view of 12 rack levels E of the rack store 1 according to FIG. 6, wherein, in the middle of the longitudinal side of the foremost rack 3, a rail vehicle lift 16 is arranged symbolically at the end of a further second guide track 8 arranged in the middle of the rack store 1. The lifts 13 are provided for conveying the items 5 and are unable to transport rail vehicles 6. If the control means detect an increased demand for rail vehicles 6 on one of the rack levels E, since a particularly high number of items 5 are to be stored or removed from storage there in the near future, the control means then actuate rail vehicles 6 from rack levels E with less traffic in order to move via the rail vehicle lift 16 to the rack level E with more intense traffic. Said rail vehicle lift 16 may also serve for moving rail vehicles 6 which require service or are already defective to a technician station. The rail vehicle lift 16 is able to transport empty rail vehicles as well as rail vehicles loaded with items.

According to a further exemplary embodiment of the invention, the lifts 13 could also be configured for conveying the rail vehicles 6 including items 5. According to a further advantageous exemplary embodiment, in a closed guide track 9, a guide track running within the closed guide track 9 could be provided, which can be used as a shortcut so that it is not necessary to travel across the entire circle of the closed guide track 9.

The control means of the rack store 1 execute a process for operating the rack store 1 for removing items 5 from storage and picking them, wherein the following process steps are performed:

One of the rail vehicles 6 of the rack level E, in which an item 5 to be picked is stored, is guided to the storage location 4 in the rack store 1, while the track sections of the closed guide track 9 are passed through only in the main direction H, with more than one rail vehicle 6 being located therein. Subsequently, the item 5 to be picked is loaded from the storage location 4 onto the rail vehicle 6. The rail vehicle 6 with the item 5 to be picked of the rack level E is moved as far as to the lift 13 or as far as to the connecting track 12 so that the track sections of the closed guide track 9 can be passed through only in the main direction H, with more than one rail vehicle 6 being located therein. The item 5 to be picked is transported by means of the lift 13 to the picking station 14 and is picked there by a picker or robot into a target container, with residual amounts of the item 5 possibly emerging. The return of the residual amounts of the item 5 into the rack store 1 is effected by the lift 13 and via guide tracks 7 and 8, while the track sections of the closed guide track 9 are passed through only in the main direction H, with more than one rail vehicle 6 being located therein. Subsequently, the item 5 is delivered from the rail vehicle 6 to a storage location 4. This method creates the advantages indicated previously with regard to the rack store 1.

Figure 10:
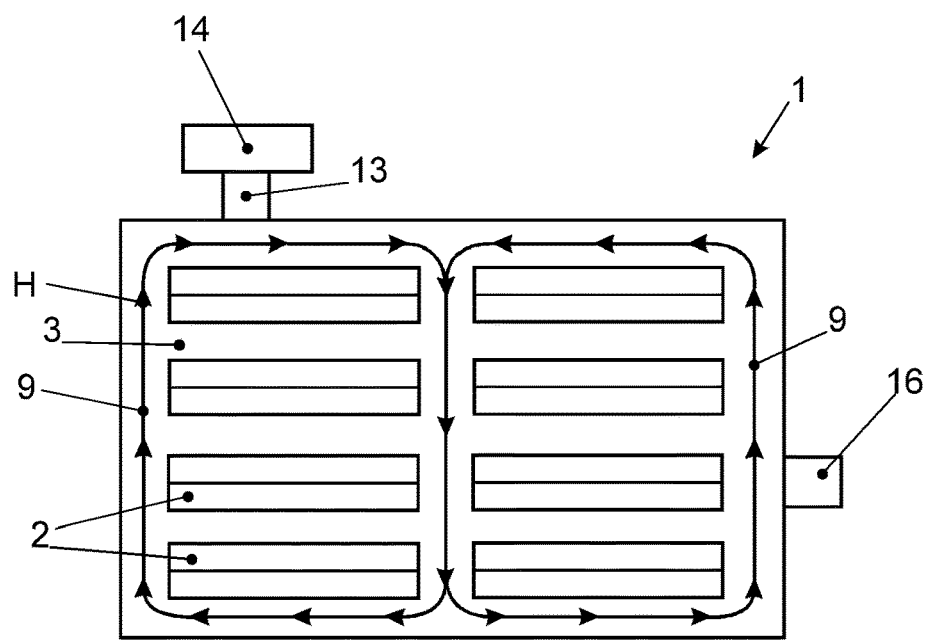
FIG. 10 shows a top view of a rack store according to a further exemplary embodiment of the invention.

FIG. 10 shows a top view of a rack store 1 according to a further exemplary embodiment of the invention, wherein eight double racks 2 are provided. The control means guide rail vehicles such that two closed guide tracks 9 with main directions H will emerge. Said rack store 1 has the advantage that, around the rack store 1, picking stations 14 can be arranged directly at lifts 13, with only one being illustrated by way of example. A rail vehicle lift 16 or other lifts and stations such as, e.g., a goods receipt station may also be arranged anywhere around the rack store 1.

It may be mentioned that the rack store according to a further exemplary embodiment of the invention could also be configured such that rail vehicles with items that have been stored and removed from storage are taken along on the lifts between the rack levels. This lift journey could also be used for loading the rail vehicle.

Furthermore, it may be mentioned that the following items known to a person skilled in the art are understood to be items within the meaning of this specification: container with several equal or different "smaller" items (pharmaceutical packages or the like); cardboard (covering box or original box, respectively) with several equal or different "smaller" items (pharmaceutical packages or the like); container with several divisions (compartments) each with several equal or different "smaller" items (pharmaceutical packages or the like); tray (loading aid) with a cardboard; tray (loading aid) with several cardboards. Likewise, it is to be noted that the rack store may exhibit single-deep or else multiple-deep storage locations in which several items can be stored one after another.

Furthermore, it may be mentioned that also a materials handling equipment can be connected to the lifts 13, which materials handling equipment delivers the sorted container flow to a dispatch ramp, a palletizing robot, a consolidating station or the like.

It may be mentioned that several different design variants are possible. The control means could have a rail vehicle travel in a track section of a closed guide track against the main direction, if no other rail vehicle is located on said track section or, respectively, will be located on said track section during the travel time of the rail vehicle. However, the control means could have a rail vehicle travel in a track section of a closed guide track against the main direction, only if no other rail vehicle is located on said closed guide track or, respectively, will be located on said closed guide track during the travel time of the rail vehicle. Both design variants can be advantageous in the respective rack store.

The control means calculate the planned routes for the individual rail vehicles and thus know for how long which rail vehicle will be on which track section. In this way, the control means calculate different variants of how the rail vehicles will get to the respective storage locations and, from there, to the corresponding picking stations and back again. The variant which, on the whole, is most advantageous depending on the current frequency of storing and removing from storage is chosen by the control means and put into practice. In doing so, the most advantageous variant can take into consideration the, on the whole, shortest transport paths, the smallest energy consumption, the lowest load on the lifts, the fastest transport of all items or of the items for which currently the most urgent demand exists for picking.

The invention claimed is:

1. A rack store for storing items in storage locations of racks, wherein at least one rack lane is formed between at least two racks, and wherein first guide tracks are provided substantially in the direction of the racks and second guide tracks are provided substantially transverse to the racks, on which guide tracks at least one rail vehicle can be moved in a controlled manner for storing and removing items, wherein
  a self-contained guide track is formed by first guide tracks and second guide tracks of a rack level and each track section of the closed guide track is determined from an intersection point of one of the first guide tracks with one of the second guide tracks to the next intersection point of one of the first guide tracks with one of the second guide tracks; and
  the at least one rail vehicle is configured to be controlled on the track sections of the closed guide track during storing and removing the items in a main direction in the form of a roundabout such that the track section of the closed guide track, on which more than one rail vehicle is located, is used by the rail vehicles only in the main direction and such that the track section of the closed guide track, on which no other rail vehicle is located, is trafficable by a rail vehicle against the main direction.

2. A rack store according to claim 1, wherein the racks comprise at least two rack levels and, on the closed guide track of each rack level, at least one lift is provided, which is connected via a connecting track to enable items removed from storage to be conveyable between the rack levels.

3. A rack store according to claim 2, wherein the at least one rail vehicle per rack level are configured such that the track sections of the closed guide tracks are used by the rail vehicles on different rack levels in main directions opposite to each other.

4. A rack store according to claim 3, wherein the closed guide tracks arranged on directly superimposed rack levels are in each case used in opposite main directions.

5. A rack store according to claim 2, wherein, on the closed guide track or on a connecting track and in particular at one of the lifts, at least one item handling station, in particular a picking station or a goods receipt station or a robot handling station, is provided, where items are stored in the rack store or removed from the rack store or restored in the rack store.

6. A rack store according to claim 2, wherein at least one and in particular both of the second guide tracks of the closed guide track of the rack levels pass through the racks and intersect the rack lanes.

7. A rack store according to claim 2, wherein at least one and in particular both of the second guide tracks of the closed guide track of the rack level are arranged on the front side of the rack store as an extension of the rack lanes outside of the racks.

8. A rack store according to claim 2, wherein, on one of the first guide tracks or the second guide tracks, a rail vehicle lift is provided in order to transport rail vehicles to different rack levels in a demand-oriented or service-oriented way.

9. A rack store according to claim 1, wherein at least one additional first guide track or second guide track is provided on the closed guide track in order to shorten the path of the rail vehicle in the roundabout.

10. A rack store according to claim 1, wherein the racks exhibit at least two rack levels and that, on the closed guide track of each rack level, at least one lift is provided to enable-the rail vehicle to be transportable with one or several items removed from storage between the rack levels.

11. A method of operating a rack store configured according to claim 1 for removing items from storage and picking them, wherein the following process steps are performed:
  guiding the rail vehicle of the rack level in which an item to be picked is stored to the storage location in the rack store;
  picking up the item from the storage location onto the rail vehicle;
  conveying the item to the picking station at which the item is picked into the target container, with residual amounts of the item possibly emerging;
  returning the residual amounts of the item to the rack store, wherein
  track sections of the closed guide track are passed through only in the main direction when storing and removing the items, if more than one rail vehicle is located on the closed guide track, and that
  track sections of the closed guide track can be used by a rail vehicle against the main direction when storing and removing the items, if no other rail vehicle is located on the track section of the closed guide track.

* * * * *